Jan. 7, 1969   R. G. HOLMES   3,420,250
ELECTRIC MANICURIST POWER HANDLE
Filed April 25, 1966   Sheet _1_ of 2
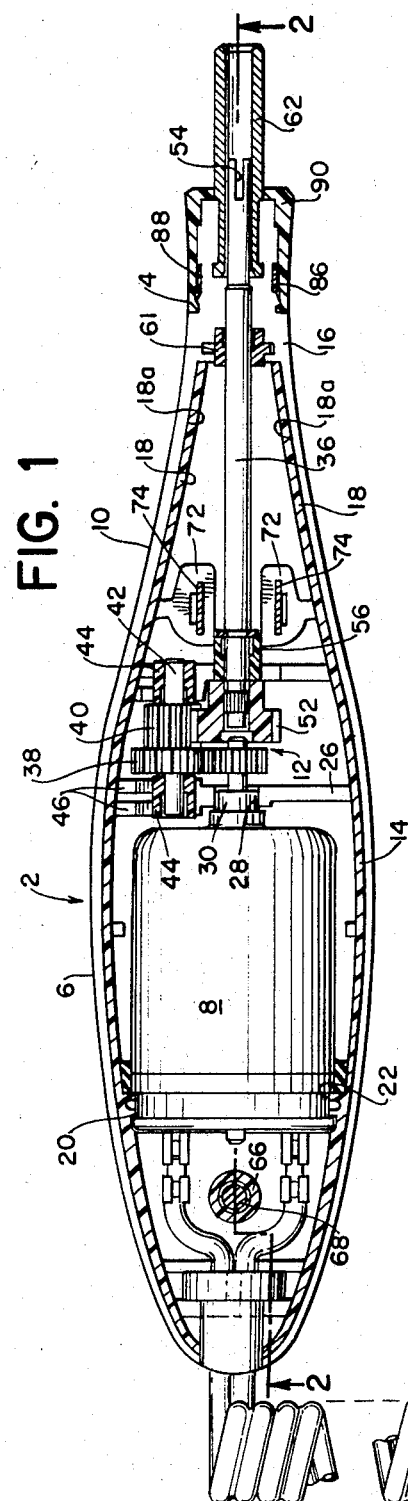
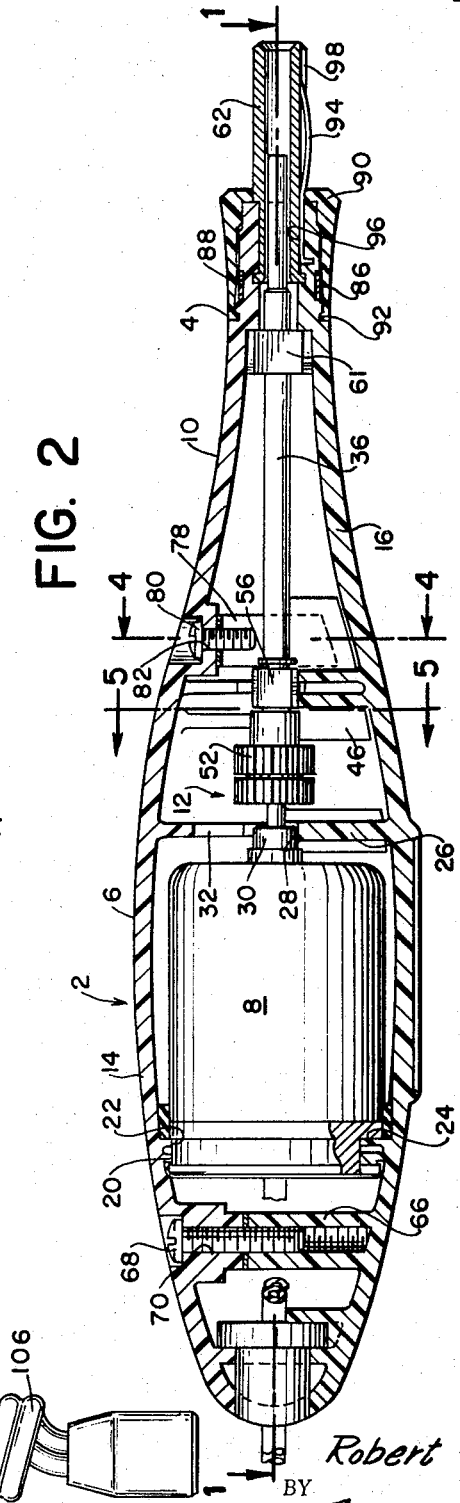
INVENTOR.
Robert G. Holmes
BY
Leonard J. Platt
ATTORNEY Jan. 7, 1969   R. G. HOLMES   3,420,250
ELECTRIC MANICURIST POWER HANDLE
Filed April 25, 1966   Sheet 2 of 2

INVENTOR.
Robert G. Holmes
BY
Leonard J. Platt
ATTORNEY

United States Patent Office 3,420,250
Patented Jan. 7, 1969

3,420,250
ELECTRIC MANICURIST POWER HANDLE
Robert G. Holmes, Westboro, Mass., assignor to General Electric Company, a corporation of New York
Filed Apr. 25, 1966, Ser. No. 544,922
U.S. Cl. 132—73.6                    6 Claims
Int. Cl. A45d 29/04

ABSTRACT OF THE DISCLOSURE

This invention discloses an electric manicurist, particularly the details of a power handle which may be held in an operator's hand in the same manner as a pencil and may be readily manipulated by minute finger forces for driving buffing pads, cuticle tools, nail files and other manicuring implements.

---

Although electrically powered and other forms of mechanized manicuring implements have been known for many years, and are valuable personal care products, the extent of their value depends to a great degree on the ease with which the power driven implement may be manipulated. Prior art electric manicurists include a relatively large electric motor which is positioned on a table or other support, and a flexible drive shaft which extends from the motor to a manicuring implement. This type of construction results in a manicuring tool which is difficult to manipulate. The flexible driveshaft is usually rather heavy and it includes an internal rotating member; thus, it is difficult to move the manicuring tool against the forces exerted by the rotating flexible shaft. This is particularly objectionable when the manicuring tool is held as a pencil and it is desired to guide the tool by minute forces which can be exerted by the fingers of the operator. Other prior art electric manicuring devices include a casing enclosing an electric motor and a manicuring tool; however, such prior art devices are so bulky that they have been designed to be held in the palm of the hand and, thus, cannot be readily manipulated.

Accordingly, it is a principal object of this invention to provide an improved electric manicurist power handle which may be held in an operator's hand in the same manner as a pencil and may be readily manipulated by minute finger forces.

It is another object of this invention to provide an electric manicurist power handle which is compact, simple in structure and capable of being manufactured at low cost.

In accordance with one aspect of my invention, an elongated casing containing an electric motor is provided for driving manicuring tools. The casing includes a first portion adjacent one end formed as a finger grip portion, a bulbous portion, and a tapered portion extending between the finger tip portion and the bulbous portion. An electric motor is conveniently positioned in the bulbous portion of the casing and an elongated rotary output shaft is positioned within the narrow fingertip portion of the casing. Gearing interconnecting the motor and the rotary output shaft is located in the tapered portion of the casing. The elongated output shaft and the casing are of such size that the manicurist may be held in the hand in the same manner as a pencil with the thumb and index finger positioned on opposite sides of the narrow finger grip portion of the casing, and the middle finger positioned at the lower portion of the casing between the thumb and index finger. The tapered portion and the bulbous portion rests smoothly on the portion of the hand at the juncture of the thumb and index finger. With this construction, the manicurist conveniently fits the hand of the operator and may be readily manipulated by minute finger forces.

Other objects and attendant advantages of this invention will be apparent when taken in conjunction with the accompanying drawing in which:

FIG. 1 is an enlarged top view of the electric manicurist power handle with a portion of the casing removed and with portions shown in section;

FIG. 2 is an enlarged cross sectional view of the electric manicurist power handle taken along the line 2—2 of FIG. 1;

Figure 6:
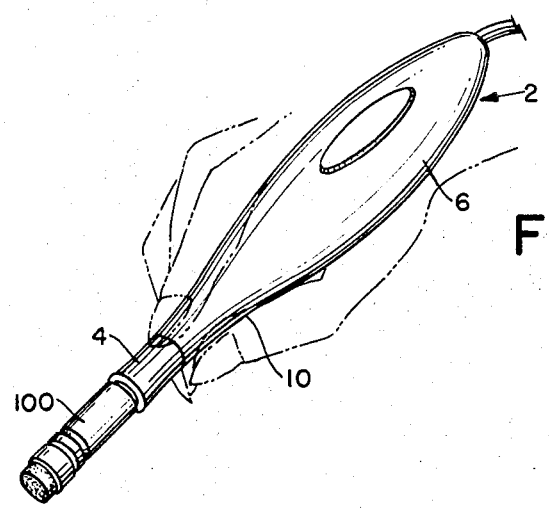
FIG. 6 is an enlarged perspective view of the electric manicurist held in the hand of an operator.

Referring to FIG. 6, there is shown my electric manicurist 2 conveniently held between the fingers of an operator. As shown in FIGS. 1 and 6, the power handle casing is uniquely formed to include a finger grip portion 4, a bulbous portion 6 for receiving an electric motor 8, and a tapered portion 10 extending between the fingertip portion and the bulbous portion for enclosing reduction gearing 12.

The casing is longitudinally separable and comprises an upper casing portion 14 and a lower casing portion 16, as is best seen in FIG. 2. The casing is made of polycarbonate or other suitable strong and light weight plastic material which may be readily formed in a molding operation. As shown, each of the casing portions includes integrally formed members 18 and 18a for securely holding and aligning the components of my novel electric manicurist power handle.

A low cost, readily manufactured arrangement is provided for securely holding the electric motor 8 within the power handle. As shown, the electric motor is generally cylindrical in shape and is provided with a circumferential cut or notch 20 at its rear portion for cooperating with one or more inwardly extending circumferential projections 22 and 24 which are integrally formed in the upper and lower casing portions, respectively. The front portion of the motor is also securely supported within the casing. As shown, a transverse rib 26 is integrally formed in the lower casing section 16 of the power handle, and a circular recess 28 is provided in the top surface of the rib for receiving a sleeve bearing 30 of the electric motor.

A unique arrangement is provided for securely holding the sleeve bearing in the recess 28. As shown more particularly in FIGS. 2 and 5, downwardly extending plastic fingers 32 are integrally formed with the upper casing 14 for securely gripping the shaft bearing 30. The lower portions of the fingers 32 are preferably shaped to include inwardly directed engaging surfaces 34. With this construction, when the top casing section 14 is pushed downwardly toward the bottom casing section 16, surfaces 34 abut bearing 30 and the fingers 32 spread slightly outwardly to securely grip the bearing 30 between surfaces 34 and the recess 28.

Figure 5:
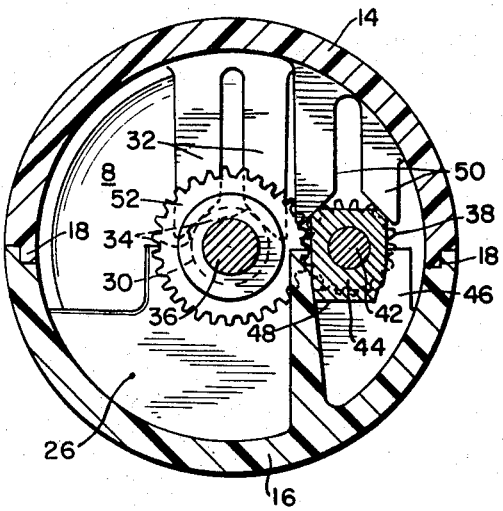
FIG. 5 is an enlarged cross sectional view of the power handle taken along the line 5—5 of FIG. 2.

Integrally formed ribs and spring fingers or hold down members are also provided in the casing sections for securely holding reduction gearing and an elongated output shaft 36. As shown, reduction gears 38 and 40 are mounted on a jack shaft 42. Two jack shaft bearings 44 include integral bearing surfaces for rotatably supporting shaft 42, and integrally formed ribs 46 are provided in the lower casing section for holding the jack shaft bearings 44. As shown in FIG. 5, the ribs 46 are formed in pairs in order to receive downwardly extending projections 48 which are integrally formed on the bearings 44. Resilient spring fingers or hold down members 50 are integrally formed with the upper casing section for securely holding the bearings 44.

In accordance with my invention, rotary output shaft 36 is made relatively long so that it can be enclosed by the long narrow finger gripping portion 4 of the casing. A gear 52 is fixed to one end of the output shaft for driving connection with reduction gear 40, and connecting means such as slot 54 is provided in the other end of the output shaft for connection with a manicuring tool. The shaft is supported at its gear end by a suitable bushing 56 which is securely held between a lower casing rib 58 and spring fingers or hold down members 60 which extend downwardly from the upper casing section 14. A C shaped retaining ring is provided for cooperation with bushing 56 to limit axial movement of the output shaft 36. A bushing 61 and a generally cylindrical sleeve bearing 62 are conveniently sandwiched between the upper and lower casing sections in order to support the forward slotted portion of the output shaft.

Figure 4:
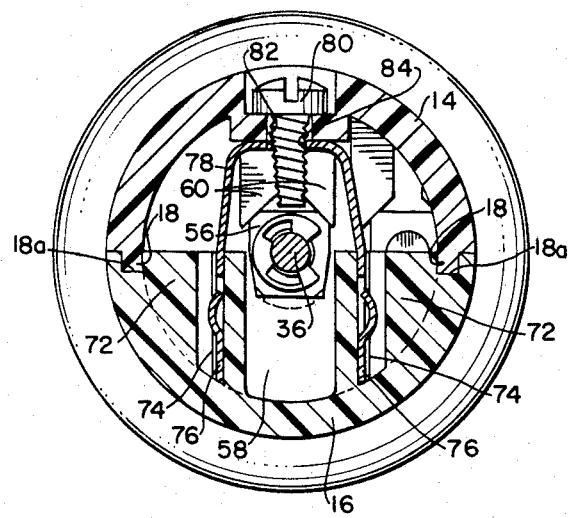
FIG. 4 is an enlarged cross sectional view of the power handle taken along the line 4—4 of FIG. 2.

A readily formed arrangement is provided for connecting the casing sections to each other. As shown, an integrally formed screw receiving lug 66 extends upwardly from the lower casing section 16 for receiving a screw 68 which is inserted through an aperture 70 which is integrally formed in the upper casing section 14. In order to securely hold the forward portions of the casing sections to each other, a pair of upwardly extending lugs 72 are integrally formed in the lower casing section; and as shown more particularly in FIG. 4, slots 74 are provided in lugs 72 for receiving arms 76 of a fastener clip 78. With this arrangement, a screw 80 may be inserted through an aperture 82 in the upper casing section and an aperture 84 in the fastener clip in order to securely hold the forward portion of the upper casing section to the forward portion of the lower casing section. To complete the assembly, a metal retaining ring 86 may be received in a complementary recess 88 which is provided in the finger grip portion of the casing, and a plastic end cap 90 may be snapped into a circumferential recess 92 which is formed in the finger grip portion of the casing.

Figure 3:
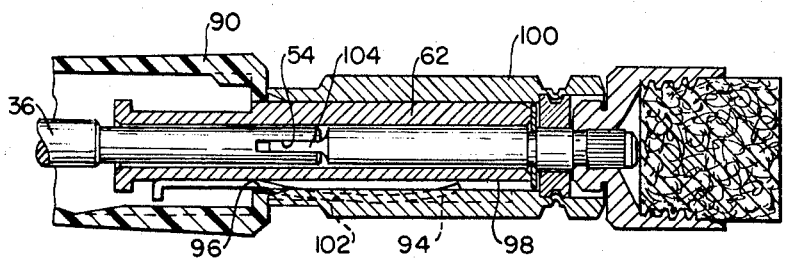
FIG. 3 is an enlarged cross sectional view showing a portion of the electric manicurist power handle connected to a buffing tool.

Referring now to FIG. 3, a retainer spring 94 is provided for selectively holding a manufacturing tool on my unique power handle. As shown, the spring 94 may be fixed to the power handle as by simply wedging one end of it into a longitudinal slot 96 which is provided in the lower casing section 16, and positioning sleeve bearing 62 over the slot. A complementary longitudinal slot 98 is provided in the lower outside portion of the sleeve bearing 62 for receiving the other end of spring 98. With this arrangement, a manicuring implement, such as a buffing tool 100 shown in FIG. 3, may be removably connected to my unique power handle by pushing the tool onto sleeve bearing 62. During this operation, the spring 94 will be positioned in a complementary slot 102 formed in the buffing tool, and a flattened end 104 of the buffing tool shaft will be positioned in the slot 54 which is formed at the end of output shaft 36.

In the preferred embodiment shown in FIG. 1, the power handle is approximately 6½" in length from its extreme end portion to the tip of sleeve bearing 62. The finger grip portion is approximately ½" in diameter, and the bulbous portion of the power handle is approximately 1½" in diameter. With this construction, it can be appreciated that my unique power handle is of such size that it may be held in the same manner as a pencil with the thumb and index finger positioned on opposite sides of the finger grip portion of the casing, and the middle finger positioned on the lower portion of the casing between the thumb and index finger as illustrated in FIG. 6. Moreover, with this construction, the bulbous portion and the tapered portion smoothly conform to the natural shape of the hand between the thumb and index finger. A low voltage motor having a voltage of approximately 14 volts is provided for driving the power output shaft 36 so that an extremely light and flexible power cord 106 may be utilized for supplying electrical power to the motor. Accordingly, the manicurist may be easily manipulated by minute fingertip forces, and may be used to perform very close work on the nails and cuticles of the user.

In view of the foregoing, it can be appreciated that my unique electric manicurist power handle utilizes a minimum number of parts which may be easily formed and assembled to each other. The lower casing section including supporting ribs 26, 46, circumferential rib 24 and lugs 72 and 76 are all formed during a molding operation. In like manner, the downwardly extending members such as resilient fingers 32 and 50 are integrally formed when the upper casing section is molded. It can also be appreciated that the other parts of the power handle may be readily assembled to each other. Thus, an exceedingly simple, rugged and reliable construction is achieved.

While there has been shown and described a particular embodiment of this invention, it will be obvious to those skilled in the art that various changes and modifications can be made therein without departing from the invention and therefore it is aimed in the appended claims to cover all such changes and modifications as fall within the true spirit and scope of the invention.

What I claim as new and desire to be secured by Letters Patent of the United States is:

1. An electric manicurist power handle comprising:
   (a) an elongated casing comprising a top section and a bottom section, each of which extends the full length of the power handle;
   (b) said casing including a first portion adjacent one end formed as a fingertip grip, a bulbous portion, and a tapered portion extending between said fingertip grip portion and said bulbous portion;
   (c) an electric motor positioned in the bulbous portion of said casing;
   (d) a transverse rib integrally formed in the bottom section of the tapered portion of said casing;
   (e) a shaft bearing positioned on said rib;
   (f) an elongated rotary output shaft mounted for rotation within said shaft bearing;
   (g) gear means interconnecting said motor and said elongated rotary output shaft;
   (h) said elongated output shaft and said casing being of such size that the electric manicurist power handle may be held in the same manner as a pencil with the thumb and index finger positioned on opposite sides of the finger grip portion of the casing and the middle finger positioned on the lower portion of said casing between said thumb and index finger, said bulbous portion resting on the curved portion of the hand at the juncture of the thumb and index finger so that the manicurist conveniently fits the hand and may be readily manipulated by minute fingertip forces.

2. An electric manicurist power handle as defined in claim 1 and further including a hold down member integrally formed in the top section of said casing, said member abutting said bushing and holding said bushing in contact with said rib.

3. An electric manicurist power handle as defined in claim 1 wherein said gear means includes reduction gearing mounted in shaft bearings, and hold down fingers are integrally formed with the upper casing section for holding the shaft in contact with portions of the lower casing section.

4. An electric manicurist power handle as defined in claim 1 and further including a pair of lugs extending upwardly from said bottom section, a fastener clip secured to said lugs and screw means for connecting said top section to said fastener clip.

5. An electric manicurist power handle as defined in claim 1 and further including a retainer spring mounted in a recess in the fingertip grip portion of the casing for holding a removable manicuring tool.

6. An electric manicurist power handle as defined in claim 1 wherein a notch is formed on the electric motor and an inwardly extending projection is integrally formed on the inside of the casing, said inwardly extending projection being inserted within the notch for securely holding the motor in said casing.

References Cited

UNITED STATES PATENTS

| 1,587,738 | 6/1926 | Whiteside. | |
|---|---|---|---|
| 2,239,870 | 4/1941 | Ariza | 132—73.6 |
| 2,389,665 | 11/1945 | Harris | 132—75.8 |
| 2,544,248 | 3/1951 | Ashmead | 132—73.6 |
| 2,699,049 | 1/1955 | Cupler | 310—50 |
| 3,034,376 | 5/1962 | Gonzalez | 310—50 |
| 3,216,034 | 11/1965 | Johnson | 132—73.6 XR |

ROBERT PESHOCK, *Primary Examiner.*

LOUIS G. MANCENE, *Assistant Examiner.*

U.S. Cl. X.R.

310—50